United States Patent
Haas et al.

(10) Patent No.: US 11,468,281 B2
(45) Date of Patent: Oct. 11, 2022

(54) DATA CARRIER WITH TAMPER-INDICATION

(71) Applicant: THALES DIS USA, INC, Austin, TX (US)

(72) Inventors: Christopher Knud Haas, Austin, TX (US); Justin Brittain, Austin, TX (US)

(73) Assignee: THALES DIS FRANCE SA, Meudon (FR)

( * ) Notice: Subject to any disclaimer, the term of this patent is extended or adjusted under 35 U.S.C. 154(b) by 0 days.

(21) Appl. No.: 17/105,721

(22) Filed: Nov. 27, 2020

(65) Prior Publication Data

US 2022/0172013 A1   Jun. 2, 2022

(51) Int. Cl.
| | |
|---|---|
| *G06K 19/06* | (2006.01) |
| *G06Q 30/00* | (2012.01) |
| *G06Q 40/02* | (2012.01) |
| *G06Q 50/26* | (2012.01) |

(52) U.S. Cl.
CPC . *G06K 19/06103* (2013.01); *G06K 19/06065* (2013.01); *G06Q 30/0185* (2013.01); *G06Q 40/02* (2013.01); *G06Q 50/265* (2013.01)

(58) Field of Classification Search
CPC .......... G06K 19/025; G06K 19/06065; G06K 19/06103; G06K 19/041; G07D 7/00; G07D 7/03; G07D 7/003; G07D 11/225; B42D 25/435; B42D 25/355; B42D 25/30; B42D 25/23; B42D 25/24

See application file for complete search history.

(56) References Cited

U.S. PATENT DOCUMENTS

| | | | | | |
|---|---|---|---|---|---|
| 4,119,361 | A | * | 10/1978 | Greenaway | G07D 7/12 359/359 |
| 4,570,252 | A | * | 2/1986 | Drexler | G11B 20/1803 365/120 |
| 5,066,047 | A | * | 11/1991 | Mailloux | B42D 25/47 283/77 |

(Continued)

*Primary Examiner* — Daniel I Walsh
(74) *Attorney, Agent, or Firm* — The Jansson Firm; Pehr B. Jansson (57) ABSTRACT

A data carrier having one optically variable element, at least one background element, which is arranged after the at least one optically variable element when seen along an extension direction, and at least one security element, which is constituted by at least a part of the at least one optically variable element and at least a part of the at least one background element. At least one tamper-indicating element is provided, which is arranged at least in a region between the at least one optically variable element and the at least one background element with respect to the extension direction. The tamper-indicating element is configured such, that the at least one optically variable element and the at least one background element at least in a region of the at least one security element are at least partially separable from one another upon an application of force onto the at least one optically variable element along a first pulling direction running opposite to the extension direction and/or upon an application of force onto the at least one background element along a second pulling direction running along the extension direction, whereby the at least one security element is at least partially separated into two or more parts.

15 Claims, 7 Drawing Sheets

(56) References Cited

U.S. PATENT DOCUMENTS

| | | | | |
|---|---|---|---|---|
| 5,310,222 A * | 5/1994 | Chatwin | G03H 1/02 | 283/109 |
| 5,683,774 A * | 11/1997 | Faykish | B42D 25/328 | 428/40.1 |
| 6,087,075 A * | 7/2000 | Kier | G09F 3/0291 | 430/1 |
| 6,164,548 A * | 12/2000 | Curiel | G03H 1/0011 | 235/487 |
| 6,372,341 B1 * | 4/2002 | Jung | G09F 3/0292 | 428/354 |
| 6,482,489 B1 * | 11/2002 | Otaki | G03H 1/0236 | 428/41.9 |
| 6,808,792 B1 * | 10/2004 | Weber | B42D 25/47 | 428/411.1 |
| 2002/0051264 A1 * | 5/2002 | Shiozawa | B42D 25/328 | 359/2 |
| 2002/0142121 A1 * | 10/2002 | Hingsen-Gehrmann | G09F 3/0292 | 428/40.1 |
| 2004/0229022 A1 * | 11/2004 | Bourdelais | B42D 25/00 | 428/195.1 |
| 2005/0118537 A1 * | 6/2005 | Lutz | B41M 5/28 | 430/338 |
| 2006/0046002 A1 * | 3/2006 | Kuo | B41M 3/14 | 428/32.34 |
| 2006/0226238 A1 * | 10/2006 | Salib | G06K 19/18 | 235/492 |
| 2007/0229928 A1 * | 10/2007 | Hoffmuller | B42D 25/391 | 359/15 |
| 2008/0094673 A1 * | 4/2008 | Holmes | B42D 25/29 | 359/2 |
| 2008/0224462 A1 * | 9/2008 | Dubner | G07D 7/0032 | 283/107 |
| 2008/0272587 A1 * | 11/2008 | Bi | G06K 19/06046 | 283/94 |
| 2010/0172000 A1 * | 7/2010 | Holmes | G03H 1/26 | 359/2 |
| 2010/0208314 A1 * | 8/2010 | Shirakura | G03H 1/0256 | 359/3 |
| 2011/0204617 A1 * | 8/2011 | Sugden | B42D 25/00 | 156/272.8 |
| 2011/0255167 A1 * | 10/2011 | Merrill | G02B 5/3041 | 204/157.15 |
| 2013/0113200 A1 * | 5/2013 | Lister | B42D 25/364 | 283/92 |
| 2015/0301500 A1 * | 10/2015 | Fickes | B32B 7/06 | 359/2 |
| 2015/0367669 A1 * | 12/2015 | Ruhland-Bauer | B42D 25/46 | 156/219 |
| 2017/0243098 A1 * | 8/2017 | Pascua | A45C 11/184 | |
| 2017/0341454 A1 * | 11/2017 | Seiis | B42D 25/29 | |
| 2018/0201043 A1 * | 7/2018 | Walter | B42D 25/328 | |
| 2019/0039401 A1 * | 2/2019 | Minamikawa | B42D 25/455 | |
| 2020/0408972 A1 * | 12/2020 | Tashiro | G02B 5/1828 | |
| 2022/0155450 A1 * | 5/2022 | Gassend | G01S 7/497 | |
| 2022/0161590 A1 * | 5/2022 | Davoine | B42D 25/435 | |
| 2022/0163709 A1 * | 5/2022 | Lin | G02B 6/00 | |
| 2022/0172013 A1 * | 6/2022 | Haas | G06Q 30/0185 | |

* cited by examiner

DATA CARRIER WITH TAMPER-INDICATION

TECHNICAL FIELD

The present invention relates to a data carrier comprising at least one security element according to claim 1, a security document comprising or consisting of such a data carrier according to claim 14, and a method of producing a data carrier comprising at least one security element according to claim 15, respectively.

PRIOR ART

Because of the value and importance associated with data carriers such as identity cards, passports, credit cards or the like, they are often the subject of unauthorized copying, alterations and forgeries. Document falsification and product counterfeiting are significant problems that have been addressed in a variety of ways. For example, it is well-known in the art to provide security elements in the data carrier, wherein the security elements indicates the authenticity of the data carrier. However, such security elements are prone to manipulations such as a removal by a forger, whereby information on the authenticity and validity of the data carrier can get lost.

SUMMARY OF THE INVENTION

It is therefore an object of the present invention to provide a data carrier which possesses an increased safety against counterfeiting.

This object is achieved with a data carrier according to claim 1. In particular, a data carrier is provided which comprises at least one optically variable element, at least one background element, which is arranged after the at least one optically variable element when seen along an extension direction, and at least one security element. The at least one security element comprises at least a part of the at least one optically variable element and at least a part of the at least one background element. The data carrier further comprises at least one tamper-indicating element, which is arranged at least in a region between the at least one optically variable element and the at least one background element with respect to the extension direction. The tamper-indicating element is configured such, that the at least one optically variable element and the at least one background element at least in a region of the at least one security element are at least partially separable from one another upon an application of force onto the at least one optically variable element along a first pulling direction running opposite to the extension direction and/or upon an application of force onto the at least one background element along a second pulling direction running along the extension direction, whereby the at least one security element is at least partially separated into two or more parts.

That is to say, the data carrier according to the invention comprises at least one security element that is composed of at least two parts. Namely a first part being provided by the optically variable element and a second part being provided by the background element. Furthermore, between said two parts, i.e. between the optically variable element and the background element. Hence, if a forger wants to remove said security element from the data carrier and pulls along the first pulling direction or the second pulling direction, the optically variable element and the background element are separated from one another. As these two elements together constitute the security element, a separation of these two parts results in a destruction of the security element. The destructed security element renders the attempt of forgery readily obvious.

To this end it should be noted that a pulling force along the first or the second pulling direction can be directly applied to the optically variable element or the background element in the event that these two elements correspond to the uppermost element and the lowermost element of the data carrier with respect to the extension direction. However, it is conceivable that further elements are arranged on or below one or both of these two elements with respect to the extension direction. For example, it is conceivable that the data carrier comprises a card body, and wherein the optically variable element and/or the background element are arranged within said card body. Said card body could correspond to a card body as it is known in the art, e.g. a card body comprising one or more layers being made of a transparent and/or plastics material, preferably being made from thermoplastics such as polycarbonate (PC), polyvinyl chloride (PVC), amorphous polyester (A-PET), co-polyester (PET-G) polyethylene terephthalate (PET), or biaxially-oriented polyethylene terephthalate (boPET). In this case, a forger might pull on the uppermost or the lowermost element of the card body. In the event that said uppermost or lowermost element does not correspond to the optically variable element or the background element, the pulling force along the first and/or the second pulling direction will not be directly applied to these elements but will be transmitted to them via those elements of the card body that are in connection with them. Hence, also in this case a separation of the optically variable element from the background element will take place.

The tamper-indicating element is preferably configured such, that it is separable into two or more parts upon the application of force along the first pulling direction and/or along the second pulling direction. The tamper-indicating element is particularly preferably configured such that it is irreversibly and visibly separable into two or more parts upon the application of force along the first pulling direction and/or along the second pulling direction. The expression "visibly" indicates here that the separation is visible to i.e. observable by an observer.

As the tamper-indicating element needs to fail when the security element is tampered, it is particularly preferred that is has strong adhesion to both the background element and the optically variable element. In addition, it is preferred that it is transparent so that the background element can be seen through the optically variable element and the tamper-indicating element in a genuine state. It is furthermore preferred that the tamper-indicating element becomes translucent when tampered. Hence, it is preferred that the tamper-indicating element exhibits a first appearance in the genuine state, i.e. untampered state of the data carrier, and that it exhibits a second appearance being different from the first appearance in a counterfeit, i.e. tampered state of the data carrier. The first appearance preferably corresponds to a transparent appearance, and the second appearance preferably corresponds to a translucent appearance. Furthermore, the counterfeit or tampered state of the data carrier preferably corresponds to a state, wherein the at least one optically variable element and the at least one background element at least in the region of the at least one security element are at least partially separated from one another. Furthermore, it is preferred if the tamper-indicating element has some aspects of mechanical toughness so that the security element can withstand normal usage of the data carrier while having some aspects of mechanical weakness so that it will fail when observing tampering attempts. Therefore, the materials that best meet these properties are typically amorphous or lightly semi-crystalline polymers such as polycarbonates, polyesters (e.g., PET), acrylics, polypropylenes (PP), polyethylenes, polystyrenes, polyurethanes, and the like. As the materials constituting the tamper-indicating element preferably exhibit some mechanical weakness, they might be cross-linked or blended with other materials to reduce their toughness. An example of this would be a transparent acrylic-based ink with significant amounts of UV-activated cross-linking agent mixed in that would become brittle after curing. Such inks are available from Sartomer, among many other suppliers. When z-directional force, which corresponds to a force along the first pulling direction and/or the second pulling direction in the context of the present application, is applied to such an ink, it cohesively fractures in a brittle manner. Another example is Gemalto Tamper Evident Destruct (TED) film, which is used in Gemalto TamperGard labels and consists of a biaxially oriented PP (BOPP) with 10-30 wt % of another polymer mixed into the BOPP that is immiscible with the PP. TED film is transparent and tough in the x and y directions, which x and y directions correspond to a direction running perpendicularly to the extension direction, but it is mechanically weak in the z direction, i.e. the extension direction. When a security element containing TED film is tampered, it splits in the z direction, exposing a rough surface due to the immiscible polymer blend. This rough surface causes each of the split portions of the TED film to turn translucent, and repairing the split portions into a single portion does not return their transparency.

Hence, a separation into two or more parts can be caused by the intrinsic properties of the tamper-indicating element.

Namely, and as explained above, the tamper-indicating element can be configured mechanically weak such that it is preferably entirely separable along a transverse direction running perpendicularly to the extension direction into an upper part and a lower part. Hence, if a forger applies a pulling force to the optically variable element or the background element, the tamper-indicating element breaks either partly or entirely along the transverse direction. Furthermore, it is conceivable that the tamper-indicating element is configured such that the upper part of the tamper-indicating element remains in connection with the optically variable element and the lower part of the tamper-indicating element remains in connection with the background element.

The expression "mechanically weak" refers to materials that have very low toughness, which is usually defined as the area under the stress-strain curve in a tensile test. Materials that plastically deform in a significant manner are generally considered to be mechanically tough, while those that fracture in a more brittle manner after little or no plastic deformation are considered to be mechanically weak because they fail at low deformations. For the mostly polymer-based materials used in the tamper-evident element of this invention, mechanically weak systems generally mean those that fail at tensile deformations less than 10%, often less than 5%, and sometimes less than 1%. For example, while BOPP (which is considered tough) typically fails at deformations >50%, TED film, which consists of a BOPP/immiscible polymer blend typically fails at deformations <2% in the z direction because of the many polymer blend interfaces within the structure.

For this invention, a mechanically weak tamper-indicating element means that its cohesive strength (that is, the internal overall toughness or strength of the material) must be at least 3 times less and preferably 10 times less than its adhesive strength to either the optically variable element or the background element and at least 3 times less and preferably 10 times less than the adhesion of the security element to the data carrier.

Additionally or in the alternative, the tamper-indicating element can comprise one or more regions of a first cohesive strength and one or more regions of a second cohesive strength being lower than the first cohesive strength. Hence, if a forger applies a pulling force to the optically variable element or the background element, the tamper-indicating element breaks such, that the regions of the first cohesive strength are separated from the regions of the second cohesive strength. The one or more regions of the first cohesive strength and the one or more regions of the second cohesive strength are preferably provided with respect to a transverse direction running perpendicular to the extension direction in an alternating manner.

The background element can be arranged on a lower surface of the tamper-indicating element. That is, it is conceivable that the background element is arranged immediately adjacent to the tamper-indicating element. Furthermore, since the tamper-indicating element can comprise an upper surface and a lower surface, wherein the upper surface is understood as the surface facing the optically variable element and the lower surface is understood as the surface facing away from the optically variable element, the background element is preferably arranged on the surface facing away from the optically variable element. In other words, it is preferred that the background element is arranged after the tamper-indicating element with respect to the extension direction.

The data carrier can further comprise at least one further background element that is arranged on an upper surface of the tamper-indicating element. That is, it is preferred that the further background element is arranged on the surface of the tamper-indicating element that faces the optically variable element. The background element and/or the further background element preferably are a print, particularly preferably in the form of an image and/or an alphanumeric character.

To this end it is preferred that the background element and the further background element together participate in the formation of a design and/or an arrangement that is destroyed upon a separation of the optically variable element from the background element. This additional destruction provides additional security against counterfeiting. In the following said additional design and/or arrangement is referred to as further security element. In the case of a tamper-indicating element that is mechanically weak, said further security element preferably corresponds to a two- or more-part security element, wherein a first part of the further security element could be provided by the further background element on the upper surface of the tamper-indicating element and a second part of the further security element could be provided by the background element on the lower surface of the tamper-indicating element. Hence, when the tamper-indicating element is torn apart into the upper and lower parts of the tamper-indicating element, the first part of the further security element is separated from the second part of the further security element. In the case of a tamper-indicating element that comprises regions of different cohesive strengths, said further security element preferably corresponds to a two- or more-part security element, wherein a first part and a second part of the further security element are arranged on regions of different cohesive strength. Hence, when the tamper-indicating element is torn apart, its regions of different cohesive strength and consequently also the different parts of the further security element are separated from one another. It should be noted here that any explanations provided with regard to the background element likewise apply to the further background element, and vice versa.

The at least one optically variable element and the at least one background element are arranged essentially entirely congruent to one another when seen along the extension direction. In other words, it is conceivable that the optically variable element and the background element essentially entirely overlap with one another. Alternatively, it is also conceivable that the optically variable element and the at least one background element are arranged partly congruent to one another when seen along the extension direction. In other words, it is conceivable that the optically variable element and the background element only partly overlap with one another. In the latter case it is conceivable that a width of the background element (optically variable element) is larger than a width of the optically variable element (background element) with respect to the transverse direction, and wherein a further optically variable element (further background element) is provided in said region of larger width. In other words, one single background element (optically variable element) could participate in the formation of two or more security elements, which two or more security elements comprise different optically variable elements (background elements).

The optically variable element preferably corresponds to a multi-layer optical film such as a thin interference film, a colour film, an optically variable ink, a diffractive element, a grating such as a resonant waveguide grating, or a plasmonic structure. That is, the optically variable element preferably corresponds to an element that has color-shifting, i.e. wavelength-shifting attributes when it is tilted. Examples of interference films include Gemalto Thin Color Mirror Films, Gemalto Clear to Cyan Films, and 3M Dichroic Glass Finishes. That is, the optically variable element preferably corresponds to a commercially available element that is well-known in the art.

Hence, the at least one optically variable element can be configured such, that i) electromagnetic radiation constituting a first reflection spectrum is reflected from the at least one optically variable element when the data carrier is observed under a first viewing angle, that ii) electromagnetic radiation constituting a second reflection spectrum being different from the first reflection spectrum is reflected from the at least one optically variable element when the data carrier is observed under a second viewing angle being different from the first viewing angle, that iii) electromagnetic radiation constituting a first transmission spectrum is transmitted through the at least one optically variable element when the data carrier is observed under the first viewing angle, and that iv) electromagnetic radiation constituting a second transmission spectrum is transmitted through the at least one optically variable element when the data carrier is observed under the second viewing angle.

The first and second viewing angles correspond to different angles by which the data carrier, and thus the optically variable element, is tilted. For example, the first viewing angle could correspond to normal view, wherein the data carrier is observed in an untilted manner. The second viewing angle then corresponds to a view being different from the normal view, wherein the data carrier is observed in a tilted manner. While the angle where this change from normal view to tilted view can occur anywhere between 10 and 80°, it is preferable if this angle of change occurs between 20 and 70°, and most preferable if it occurs between 30 and 60°.

As mentioned initially, the security element comprises at least part of the optically variable element and at least part of the background element. Hence, an overall reflection or overall transmission spectrum that is reflected from or transmitted through the data carrier therefore depends on the characteristics of the optically variable element as well as on the characteristics of the background element. The at least one background element is therefore preferably configured such, that an overall first reflection spectrum that is reflected from the data carrier when the data carrier is observed under the first viewing angle essentially corresponds to i) the first reflection spectrum (if the background element corresponds to a black background or transparent background, see below), or ii) the first transmission spectrum (if the background element corresponds to a white background, see below), or iii) a first combination spectrum being constituted by the first transmission spectrum and electromagnetic radiation constituting a first background reflection spectrum that is reflected from the at least one background element upon impingement of the electromagnetic radiation constituting the first transmission spectrum (if the background element corresponds to a coloured background, see below).

Additionally or alternatively the at least one background element is preferably further configured such, that an overall second reflection spectrum that is reflected from the data carrier when the data carrier is observed under the second viewing angle essentially corresponds to i) the second reflection spectrum (if the background element corresponds to a black background or transparent background, see below), or ii) the second transmission spectrum (if the background element corresponds to a white background, see below), or iii) a second combination spectrum being constituted by the second transmission spectrum and electromagnetic radiation constituting a second background reflection spectrum that is reflected from the at least one background element upon impingement of the electromagnetic radiation constituting the second transmission spectrum (if the background element corresponds to a coloured background, see below).

For example, the at least one background element can be composed of one or more materials being configured to essentially completely absorb impinging electromagnetic radiation in the visible region of the electromagnetic spectrum or to essentially completely transmit impinging electromagnetic radiation in an ultraviolet region, a visible region and an infrared region of the electromagnetic spectrum. That is, the at least one background element is preferably of a black colour or is transparent.

However, it is likewise conceivable that the at least one background element is composed of one or more materials being configured to essentially entirely reflect impinging electromagnetic radiation in the visible region of the electromagnetic spectrum. That is, the at least one background element is preferably of a white colour.

Furthermore, it is likewise conceivable that the at least one background element is composed of one or more materials being configured to reflect electromagnetic radiation being composed of one or more wavelengths in the visible region of the electromagnetic spectrum upon impingement of electromagnetic radiation in the visible region of the electromagnetic spectrum. That is, the at least one background element is preferably coloured.

Hence, the background element can be provided in a variety of ways. For example, the background element can correspond to a printed feature, wherein it can be printed using any ink, including flexographic, offset, inkjet, toner, letterpress, and screen press inks. Alternatively, the background element could be formed from a foil, film, or could be laser-marked using techniques common in various imaging processes.

The data carrier can further comprise at least one coating element that is arranged before the at least one optically variable element with respect to the extension direction, wherein the at least one coating element is configured to absorb electromagnetic radiation constituting the first reflection spectrum and/or the second reflection spectrum and/or the first transmission spectrum and/or the second transmission spectrum and/or the first combination spectrum and/or the second combination spectrum. Additionally or alternatively the coating can be configured to diffuse electromagnetic radiation constituting the first reflection spectrum and/or the second reflection spectrum and/or the first transmission spectrum and/or the second transmission spectrum and/or the first combination spectrum and/or the second combination spectrum. Hence, the coating prevents an emission of electromagnetic radiation being emitted from the background element and/or from the optically variable element towards an outside. Said coating element can therefore be used to selectively block an emission of radiation. In doing so further appearances of the security element can be generated.

The coating element can be provided in the form of a light-scattering surface or sub-surface feature made from transparent materials such as polycarbonate, acrylics, polyesters, polyethylene, poly vinyl chloride, polypropylene, polyurethanes, polystyrene, and their copolymers and derivatives. These materials can be shaped or structured using coating or embossing operations to generate the light-scattering surface. Alternatively, the coating can include other materials such as ceramic beads or particles, cellulosic materials, or other polymeric materials that are designed to scatter light The at least one optically variable element can comprise one or more embossments, wherein electromagnetic radiation that is reflected from the optically variable element differs from electromagnetic radiation being reflected from the one or more embossments. The embossment preferably corresponds to a compression of the optically variable element along the extension direction, and/or the optically variable element preferably corresponds to an interference film. In this way, a thickness of the optically variable element in the regions of the embossments is different from a thickness of the optically variable element in regions without embossment. Said different thicknesses lead to an overall reflection spectrum of electromagnetic radiation of wavelengths being different in regions of the embossment as compared to regions without embossment.

It is conceivable that the data carrier comprises two or more security elements, two or more further security elements, two or more embossments, etc. In particular, it is conceivable that the data carrier comprises at least one further optically variable element, wherein the at least one optically variable element and the at least one further optically variable element are arranged on a same height or on a different height when seen along the extension direction. Additionally or alternatively it is conceivable that the at least one optically variable element and the at least one further optically variable element are arranged immediately adjacent to one another or at a distance from one another with respect to a transverse direction running perpendicularly to the extension direction. Additionally or alternatively it is conceivable that the data carrier comprises at least one further background element, wherein the at least one background element and the at least one further background element are arranged on a same height or on a different height when seen along the extension direction. Additionally or alternatively it is conceivable that the at least one background element and the at least one further background element are arranged immediately adjacent to one another or at a distance from one another with respect to a transverse direction running perpendicularly to the extension direction. In this way, a variety of security elements of different reflection or transmission characteristics can be generated.

In a further aspect a security document comprising or consisting of a data carrier as described above is provided. The security document preferably is an identity card, a passport, a credit card, a bank note, a security label, or the like. That is, the data carrier per se can correspond to a security document. Or, the data carrier can be part of a security document. For example, in the case of a passport it is conceivable to incorporate the data carrier into a page of the passport.

In a further aspect a method of producing a data carrier, preferably a data carrier as described above, is provided, the method comprising the steps of i) providing at least one optically variable element, ii) providing at least one background element, which is arranged after the at least one optically variable element when seen along an extension direction, and iii) providing at least one security element. The at least one security element comprises at least a part of the at least one optically variable element and at least a part of the at least one background element. The method further comprises the step of iv) providing at least one tamper-indicating element at least in a region between the at least one optically variable element and the at least one background element with respect to the extension direction. The tamper-indicating element is configured such, that the at least one optically variable element and the at least one background element at least in a region of the at least one security element are at least partially separable from one another upon an application of force onto the at least one optically variable element along a first pulling direction running opposite to the extension direction and/or upon an application of force onto the at least one background element along a second pulling direction running along the extension direction, whereby the at least one security element is at least partially separated into two or more parts.

In a preferred method step, the at least one tamper-indicating element is applied to the optically variable element by coating, preferably by flexographic printing. To this end it is conceivable that the tamper-indicating element is printed according to at least one pattern. However, two or more patterns are conceivable, as well. For example, a tamper-indicating element that is configured mechanically weak can be printed according to a first print pattern. A tamper-indicating element that is configured cohesively strong can be printed according to a second print pattern, wherein said second print pattern is preferably printed in a subsequent or previous printing step. In a further preferred method step, the background element is preferably printed on a side being opposite to the optically variable element with respect to the extension direction, whereby the security element that comprises at least part of the optically variable element and the background element is formed. In a further preferred method step, an adhesive element, preferably in the form of an adhesive layer, can be adhered to the security element so that it can be affixed to the data carrier.

In another preferred embodiment, the optically variable element can be adhered to a film-based tamper-indicating element using an adhesive with an adhesive and cohesive strength both greater than that of the cohesive strength of the tamper-indicating element. On the side opposite that of the optically variable element with respect to the extension direction, the background element can be printed, forming the security element. An adhesive element can then be adhered to the security element so that it can be affixed to the data carrier.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

FIGS. 1a to 2b depict two different embodiments of a data carrier 1 according to the invention, which data carriers 1 in each case comprise an optically variable element 2 and background element 5a. Additionally, the data carrier 1 comprises a substrate 3 such as a paper layer, one or more layers constituting a card body as it is known in the art, etc. The background element 5a is arranged after the optically variable element 2 when seen along an extension direction E. In the present example, the optically variable element 2 and the background element 5a constitute a security element 4. The security element 4 preferably has the shape of an image such as a photo and/or an alphanumeric character. An alphanumeric character could be the name of a person or of a country, a document number, a registration number, or a code, for example. An image could be a photograph, a portrait, the outline of a country, a national coat of arms, a national flag, or a graphical information item, for example. A tamper-indicating element 7 is arranged between the optically variable element 2 and the background element 5a. An adhesive 9 would typically be applied to the backside of the background layer 5a to adhere to the data carrier 3. The adhesives used in layer 9 could be based on acrylics, natural rubbers, silicones, ethylenes, urethanes, or any other type of standard adhesive system. They might be pressure-sensitive, heat-activated, or structural adhesives. The adhesive 9 has a cohesive and adhesive strength that is higher than the force required to separate the tamper-indicating element 7. The tamper-indicating element 7 is configured such, that the optically variable element 2 and the background element 5a are separable from one another upon an application of force onto the optically variable element 2 along a first pulling direction P1 running opposite to the extension direction E and/or upon an application of force onto the background element 5a along a second pulling direction P2 running opposite to the first pulling direction P1 and along the extension direction E, whereby the security element 4 is separated into two or more parts 4a, 4b. Hence, if a forger wishes to remove the security element 4 from the data carrier 1 and pulls on the optically variable element 2 or on the background element 5a, respectively, these two elements 2, 5a are separated from one another. As the security element 4 is constituted by these two elements 2, 5a, the security element 4 is destroyed by their separation. The destroyed security element renders the forgery of the data carrier 1 readily apparent. At this point, it should be noted that the data carrier 1 is not limited to the number of layers that are depicted in these figures. Instead, it is conceivable that the data carrier additionally comprises one or more further layers, as they are known in the state of the art.

Figure 1A:
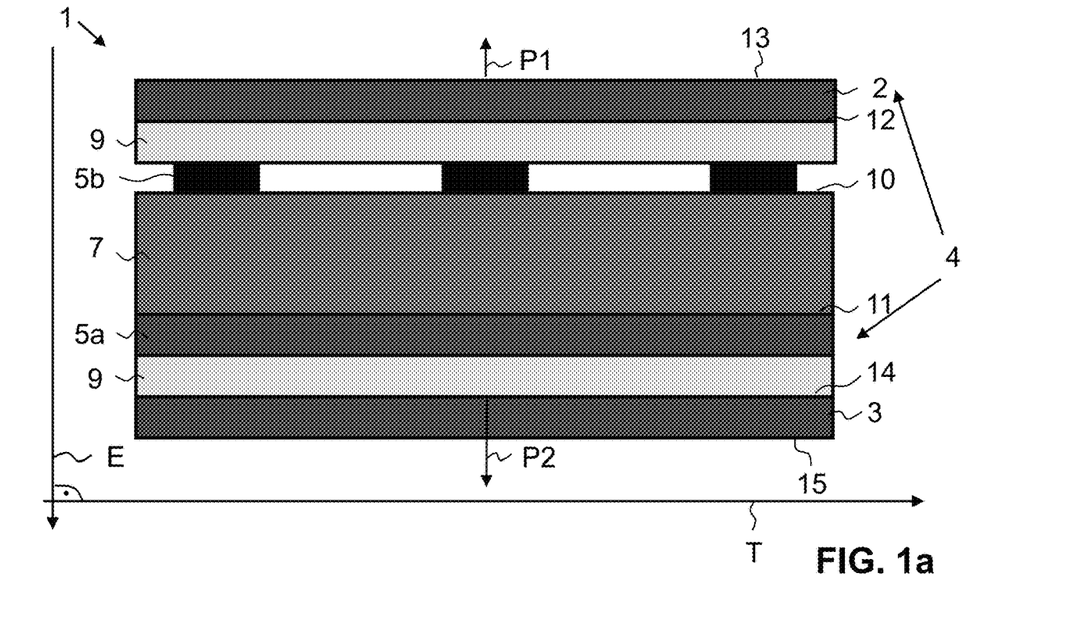
FIG. 1a shows a sectional view through a data carrier comprising a tamper-indicating layer in an untampered state.

In the embodiment depicted in FIG. 1a, the tamper-indicating layer 7 is configured such, that it is separated into two parts 7a, 7b, namely an upper part 7a and a lower part 7b, upon the application of force along the first pulling direction P1 and/or along the second pulling direction P2. To this end the tamper-indicating layer 7 is configured mechanically weak such that it breaks along the transverse direction T into the upper part 7a and the lower part 7b, wherein the upper part 7a of the tamper-indicating layer 7 remains in connection with the optically variable layer 2 and the lower part 7b of the tamper-indicating layer 7 remains in connection with the background layer 5a, see FIG. 1b. Furthermore, in order to prevent simple re-adhesion of the upper part 7a and the lower part 7b, the splitting of the tamper-indicating layer 7 reveals a fractured surface on upper part 7a and lower part 7b with a change in optical appearance.

Figure 1B:
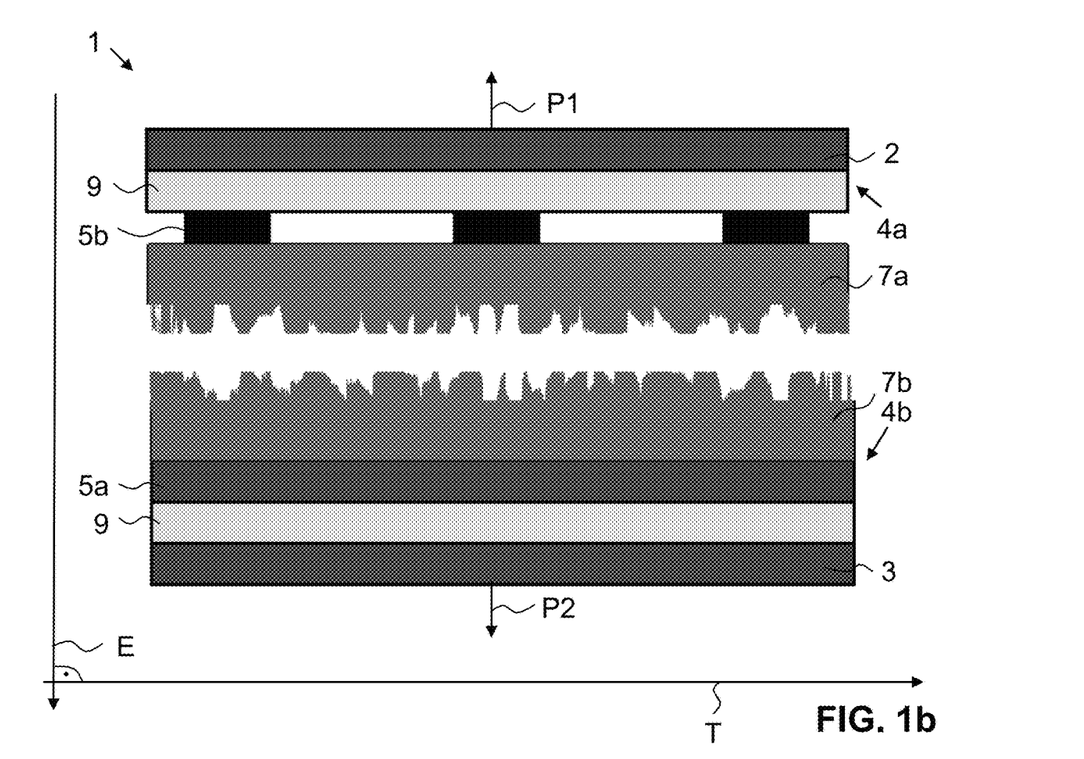
FIG. 1b shows a sectional view through the data carrier according to FIG. 1a in a tampered state.
Figure 2A:
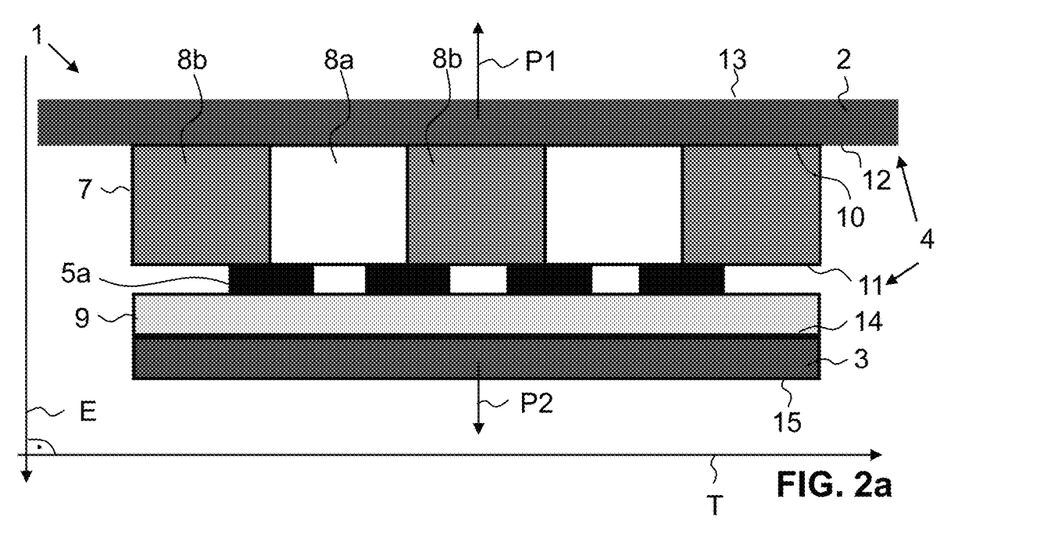
FIG. 2a shows a sectional view through a data carrier comprising a tamper-indicating layer according to another embodiment in an untampered state.

In the embodiment depicted in FIG. 2a, the tamper-indicating layer 7 comprises regions of a first cohesive strength 8a and regions of a second cohesive strength 8b being lower than the first cohesive strength. These regions 8a, 8b are arranged in an alternating manner with respect to the transverse direction T. In the present example, these regions 8a, 8b of the tamper-indicating layer 7 are in direct contact with the optically variable element 2 and the background layer 5a. An adhesive 9 would typically be applied to the backside of the background layer 5a to adhere to the data carrier 3. The adhesives used in layer 9 could be based on acrylics, natural rubbers, silicones, ethylenes, urethanes, or any other type of standard adhesive system. They might be pressure-sensitive, heat-activated, or structural adhesives. The adhesive 9 has a cohesive strength that is higher than the cohesive strength of region 8b and an adhesive strength to the substrate 3 or a cohesive strength that is less than the cohesive strength of region 8a. Hence, if a forger pulls on the optically variable element 2 along the first pulling direction P1 the optically variable element 2, the tamper-indicating layer 7 and the background layer 5a in the regions of the first cohesive strength 8a, and the adhesive 9 being in connection with said regions 8a of the tamper-indicating layer 7 of first cohesive strength are removed from the substrate 3, see FIG. 2b. Since the tamper-indicating layer 7 in the regions of the second cohesive strength 8b is mechanically weak as it is the case with the tamper-indicating layer 7 according to FIGS. 1a and 1b, the tamper-indicating layer 7 in those regions 8b likewise splits during the action of the force in an upper part remaining in connection with the optically variable element 2 and a lower part remaining in connection with the substrate 3. Furthermore, the background element 5a (is therefore split between the upper portion 4a and the lower portion 4b in an upper background element portion 5a1 and a lower background element portion 5a2.

The tamper-indicating element 7 shown in FIGS. 1a to 2b is preferably transparent or essentially transparent such that the background element 5a can participate in the formation of the security element 4 that comprises the optically variable element 2 and said background element 5a. The tamper-indicating element 7 furthermore has a high adhesion to the optically variable element 2 and background element 5a, features a durability in a transverse direction T running perpendicularly to the extension direction E, and yet has mechanical weakness in cohesion in the first and second pulling direction P1 and P2. An example of a tamper-indicating element that would generate the effect shown in FIGS. 1a and 1b would be Gemalto TED film. An example of the materials used in FIGS. 2a and 2b would include UV curable inks where the inks used in the region 8a have a higher cohesive strength than the adhesive strength at interface 14 formed between the substrate 3 and the adhesive 9 while the inks used in region 8b would have a cohesive strength lower than the adhesive strength at the interface 14.

Figure 2B:
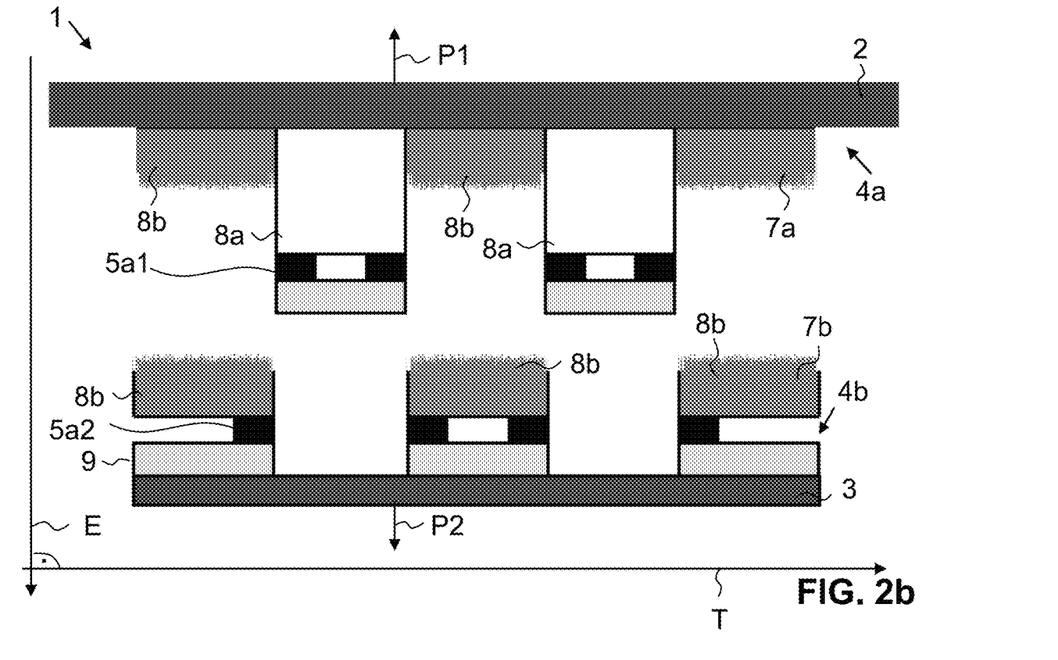
FIG. 2b shows a sectional view through the data carrier according to FIG. 2a in a tampered state.

In a preferred embodiment, the data carriers 1 according to FIGS. 1a and 1b and, although not depicted, according to FIGS. 2a and 2b in each case comprise further background element 5b which corresponds here to a printing. In fact, in the data carrier 1 according to FIGS. 1a and 1b a further background element in the form of a printed pattern 5b is provided between an upper surface 10 of the tamper-indicating layer 7 and a layer 9 being made of a pressure-sensitive adhesive that is applied to a lower surface 12 of the optically variable element 2. In this embodiment, the printing pattern 5b is the same color as the background element 5a, so it would be hidden in the configuration shown in FIG. 1a. In other words, the background element 5a and the further background element 5b together participate in the formation of a further security element. Upon tampering, the printing pattern 5b would now be revealed in upper portion 4a, preventing re-use of upper portion 4a in a counterfeit security element, providing a second security element. The destruction of the common further security element provides additional evidence of forgery.

In the data carrier 1 according to FIG. 1a, the optically variable element 2, the background element 5a, and the tamper-indicating element 7 are provided as layers that extend parallel to one another and along the transverse direction T running perpendicularly to the extension direction E. Furthermore, the optically variable element 2, the background element 5a, and the tamper-indicating layer 7 are arranged congruent to one another when seen along the extension direction E. However, in the data carrier 1 according to FIG. 2a, only the substrate 3 and the tamper-indicating layer 7 are arranged congruent with one another when seen along the extension direction E, whereas a width of the optically variable element 2 is longer than a width of the substrate 3 and the tamper-indicating layer 7 with respect to the transverse direction T.

Figure 3:
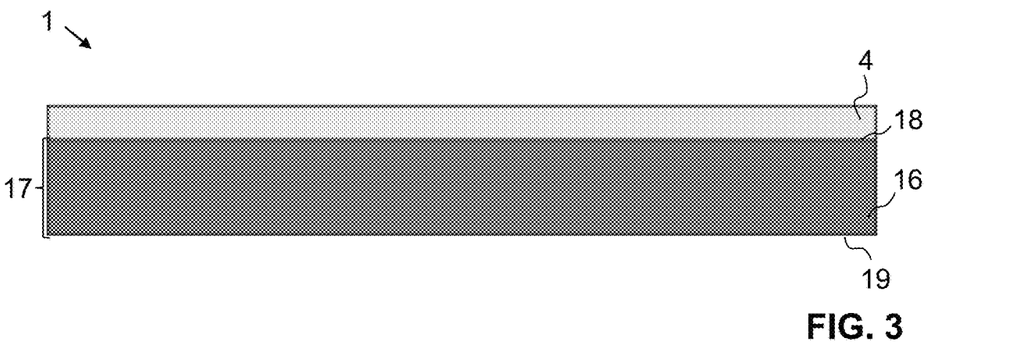
FIG. 3 shows a sectional view through a data carrier comprising a card body and an optically variable element arranged according to a first arrangement.
Figure 4:
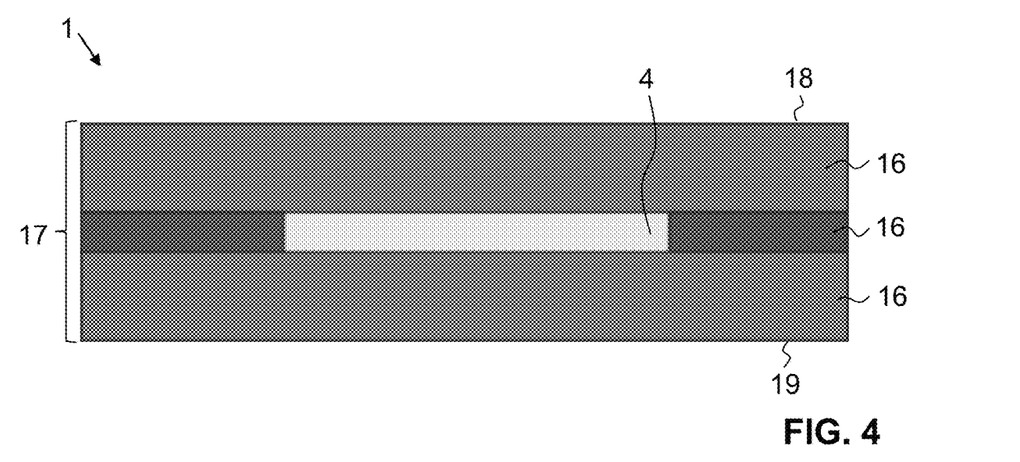
FIG. 4 shows a sectional view through a data carrier comprising a card body and an optically variable element arranged according to a another arrangement.
Figure 5:
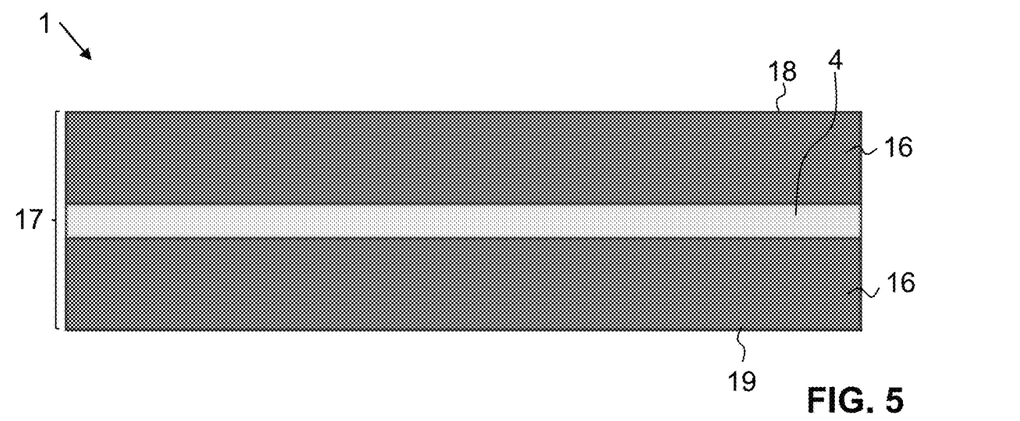
FIG. 5 shows a sectional view through a data carrier comprising a card body and an optically variable element arranged according to a another arrangement.

FIGS. 3 to 5 depict several conceivable arrangements of the security element 4 on or within a data carrier 1. If the optically variable element has different optical properties when viewed in transmission or in reflection (e.g., a thin interference film or a plasmonic device), there is value in being able to view the security element in either reflection or transmission. To this end it should be noted that the data carriers 1 preferably comprise one or more intermediate layers 16, which have transparency or translucency so that the transmission electromagnetic wavelengths can be observed when viewing the security data carriers 1 in transmission. If the data carrier is a card body, the intermediate layers 16 may consist of plastics or adhesives or a combination of plastics or adhesives as it is known in the art. Hence, preferred intermediate layers 16 are thermoplastic layers such as polycarbonate (PC), polypropylene (PP), polyethylene (PE), polyvinyl chloride (PVC), amorphous polyester (A-PET), co-polyester (PET-G) polyethylene terephthalate (PET), or biaxially-oriented polyethylene terephthalate (boPET) layers. If the data carrier is provided in a security document such as a passport, the intermediate layers may consist of security paper, etc. The intermediate layers could contain other security elements such as DOVIDs, security print, RFID chips, etc. The security element 4 can be on the surface of the data carrier (see FIG. 3) or within the body of the data carrier (FIG. 5) either across the entire data carrier or only across a section (FIG. 4) such as part of a transparent window within the data carrier. These intermediate layers 16 can be said to constitute a card body 17. Hence, the data carrier 1 can comprise a card body 17 comprising one or more of said intermediate layers 16. If two or more of said intermediate layers 16 are present it is preferred that these intermediate layers are stuck one on the other so as to form a multi-layer structure. The card body 17 comprises a top surface 18 and a bottom surface 19, wherein the top surface 18 corresponds to a surface of the uppermost intermediate layer 16 within the card body 17 and the bottom surface 19 corresponds to a surface of the lowermost intermediate layer 16 within the card body 17. In the embodiment depicted in FIG. 3, the optically variable element 2 is arranged on the top surface 18 of the card body 17, wherein said card body 16 consists of a single intermediate layer. In FIGS. 4 and 5, the card body 17 comprises three intermediate layers 16, and wherein the optically variable element 2 is arranged between said two of said intermediate layers 16. In the example depicted in FIG. 4, the optically variable element 2 extends partially along a width of the intermediate layers 16. In FIG. 5, however, the optically variable element 2 extends along an entire width of the intermediate layers 16.

Figure 6A:
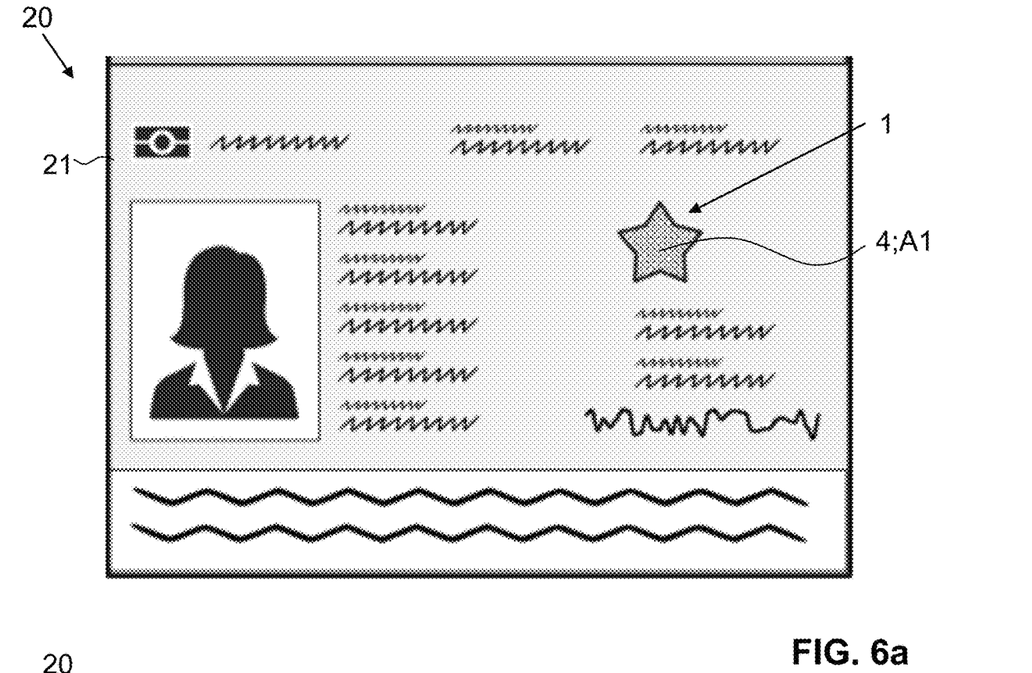
FIG. 6a shows a normal view on a security document comprising a data carrier with a security element of a first appearance.
Figure 6B:
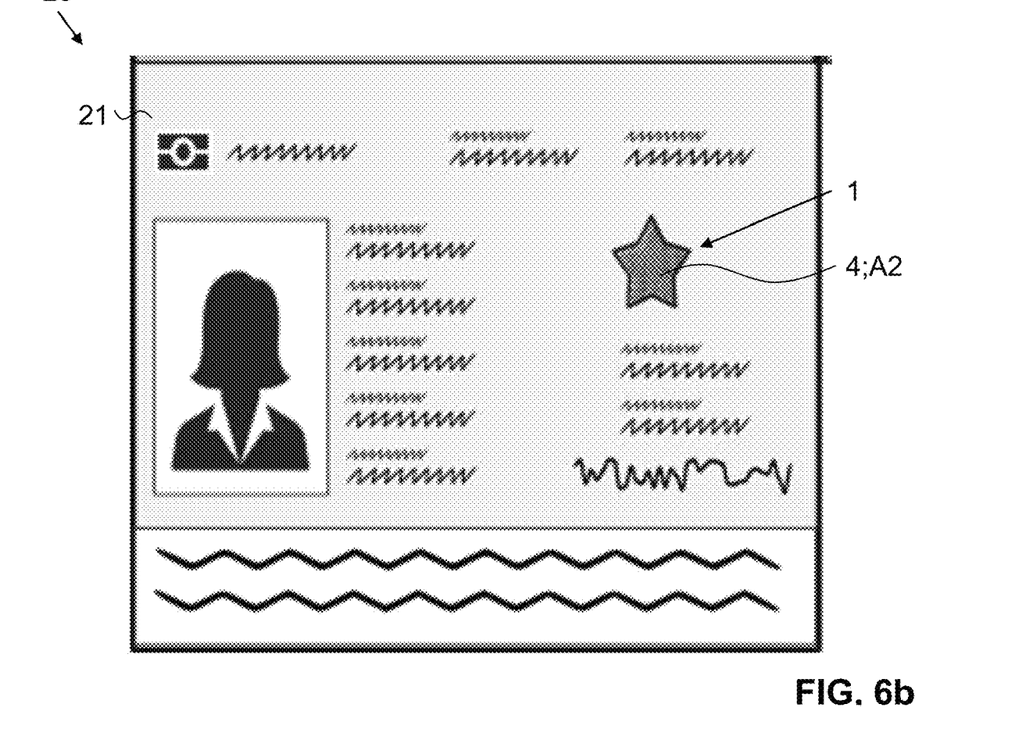
FIG. 6b shows an off-angle view on the security document according to FIG. 6a, wherein the security element has a second appearance.

The data carriers 1 according to the invention can constitute a security document on their own or they can be incorporated into a security document. An example of the latter case is depicted in FIGS. 6a and 6b, wherein a data carrier 1 comprising a security element 4 according to the invention is integrated into the page 21 of a security document 20 in the form of a passport. FIGS. 6a and 6b depict different views of said page 21. That is, the page 21 depicted in FIG. 6a corresponds to a normal view, whereas the page 21 depicted in FIG. 6b corresponds to a tilted view.

As readily follows from a comparison between FIGS. 6a and 6b, the security element 4 according to FIG. 6a is of a first appearance A1 and the security element 4 according to FIG. 6b is of a second appearance A2 which differs from the first appearance A1. This change in appearance in dependence of an observation angle is caused by the physical characteristics of the optically variable layer 2 and/or of the background layer 5a that participate in the formation of said security element 4.

In a preferred embodiment, the optically variable element 2 corresponds to a multi-layer optical film such as a thin interference film, a colour film, an optically variable ink, a diffractive element, a grating such as a resonant waveguide grating, or a plasmonic structure. That is, the optically variable element 2 corresponds to an element that has color-shifting, i.e. wavelength-shifting attributes when it is tilted. That is, the optically variable element 2 is configured such, that i) electromagnetic radiation EM constituting a first reflection spectrum R1 is reflected from the optically variable element 2 when the data carrier 1 is observed under a first viewing angle, ii) electromagnetic radiation constituting a second reflection spectrum R2 being different from the first reflection spectrum R1 is reflected from the at least one optically variable element 2 when the data carrier 1 is observed under a second viewing angle being different from the first viewing angle, iii) electromagnetic radiation EM constituting a first transmission spectrum T1 is transmitted through the at least one optically variable element 2 when the data carrier 1 is observed under the first viewing angle, and iv) electromagnetic radiation EM constituting a second transmission spectrum T2 is transmitted through the at least one optically variable element 2 when the data carrier 1 is observed under the second viewing angle. Furthermore, depending on the absorption, reflection and transmission properties of the background layer 5a, different overall colors can be created. The first viewing angle corresponds to an observation of the data carrier 1 in an untilted manner, i.e. normal to a surface of the data carrier 1. The second viewing angle corresponds to an observation of the data carrier 1 in a tilted manner, i.e. at an angle with respect to a surface of the data carrier 1 being different from 90°.

Figure 7A:
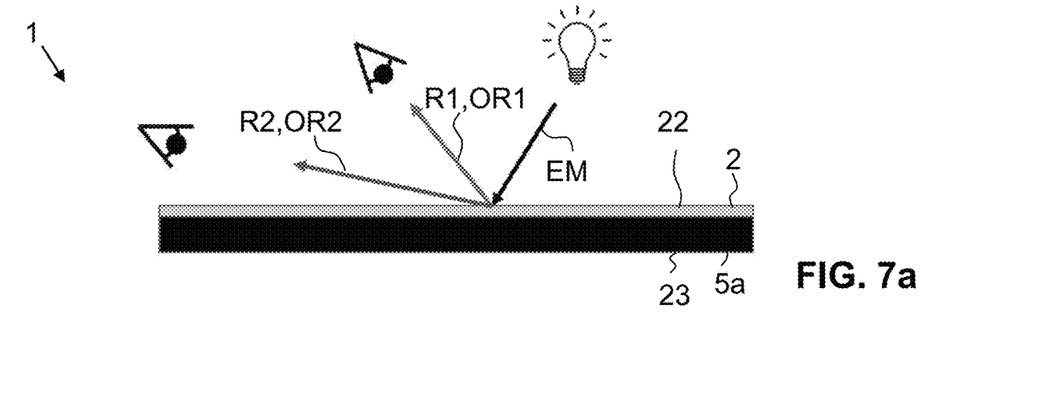
FIG. 7a schematically illustrates a reflection behaviour of electromagnetic radiation being incident on a data carrier comprising an optically variable element and a black background element.
Figure 7B:
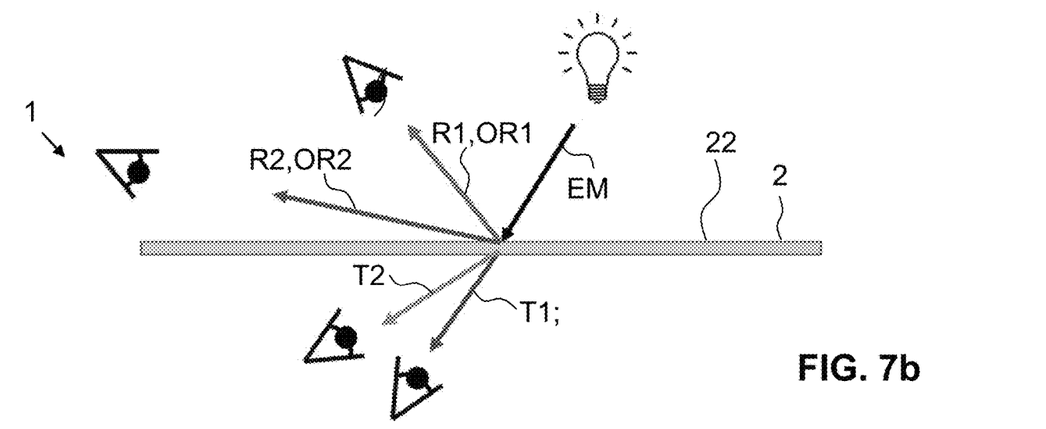
FIG. 7b schematically illustrates a reflection and transmission behaviour of electromagnetic radiation being incident on a data carrier comprising an optically variable element and a transparent background element.

These phenomena shall be illustrated with the help of FIGS. 7a to 7b. In all these figures electromagnetic radiation EM consisting of white light is impinging on the optically variable element 2. The aspects described in these figures are typical when the optically variable element 2 is a thin interference film, which is a preferred embodiment.

Furthermore, FIG. 7a depicts an optically variable element 2 and a background layer 5a consisting of an opaque (i.e., EM-absorbing) material such as a black print. Because of its absorbing properties, any transmission radiation that is transmitted through the optically variable element 2 and which impinges on the background layer 5a is absorbed by the background layer 5a. Consequently, an observer will observe an overall first reflection spectrum OR1 that is reflected from the optically variable element 2 that corresponds to the first reflection spectrum R1 when the data carrier 1 is observed under a first viewing angle, and an overall second reflection spectrum OR2 that corresponds to the second reflection spectrum R2 when the data carrier 1 is observed under the second viewing angle.

FIG. 7b depicts an optically variable element 2 that is arranged on a transparent background layer, through which electromagnetic radiation EM can transmit. Consequently, an observer will observe an overall first reflection spectrum OR1 that corresponds to the first reflection spectrum R1 when the data carrier 1 is observed in reflection, i.e. from a frontside 22 of the data carrier 1, and under the first viewing angle, as well as a first transmission spectrum T1 when the data carrier 1 is viewed in transmission, i.e. from a backside 23 of the data carrier 1. Furthermore, an observer will observe an overall second reflection spectrum OR2 that corresponds to the second reflection spectrum R2 when the data carrier 1 is observed in reflection and under the second viewing angle, as well as a second transmission spectrum T2 when the data carrier 1 is viewed in transmission. It should be noted that, in the case of the preferred embodiment when the optically variable element 2 is a thin interference film, the first transmission spectrum T1 typically corresponds to the complementary color of the first reflection spectrum R1, and the second transmission spectrum T2 typically corresponds to the complementary color of the second reflection spectrum R2.

Figure 7C:
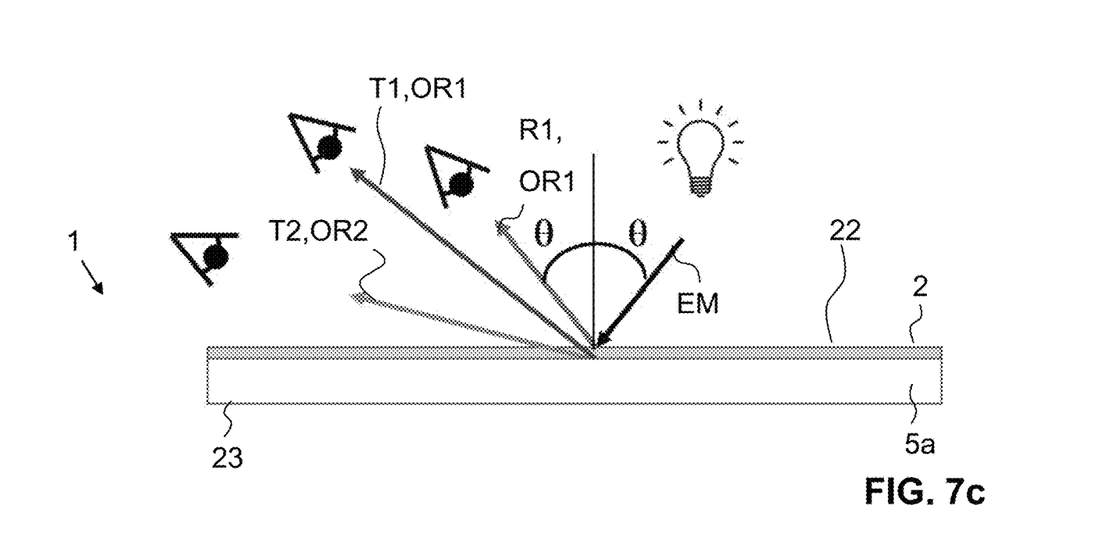
FIG. 7c schematically illustrates a reflection behaviour of electromagnetic radiation being incident on a data carrier comprising an optically variable element and a white background element.

FIG. 7c depicts an optically variable element 2 that is arranged on a diffusely reflective white background layer 5a. As in FIGS. 7a and 7b, reflected electromagnetic radiation is reflected in a specular manner from the optically variable element 2. If the incoming white light is shown at angle θ from normal of the surface of optically variable element 2, then the reflected electromagnetic radiation EM will be observed as R1 when data carrier 1 is viewed at angle θ from normal. White background layer 5a is configured to reflect any electromagnetic radiation EM that is transmitted through the optically variable element 2. Since the white background layer 5a is diffusely reflective, the transmitted electromagnetic radiation will diffusely reflect from the white background layer 5a and transmit through the optically variable element 2 towards the viewer. This diffusely reflected electromagnetic radiation will dominate in most near-normal viewing angles that are not approximately θ. Consequently, an observer at angle θ will observe an overall first reflection spectrum OR1 that corresponds to the first reflection spectrum R1 but will see the diffusely reflected transmission spectrum T1 at any angle near normal but not exactly angle θ. As the optically variable element 2 is tilted, an observer will observe the diffusely reflected transmission spectrum T2. Therefore, a security element 4 using a thin interference film as the optically variable element can present at least three different and distinct colours depending on the viewing angle if the background elements contain black and white printing: T1, R1, and R2.

Although not depicted in FIGS. 7a to 7c, a further conceivable scenario corresponds to an optically variable element 2 that is arranged on a colored background layer 5a. In this case, a combination of electromagnetic radiation constituting a background spectrum that is reflected from the background layer 5a upon impingement of electromagnetic radiation being transmitted through the optically variable element 2 with electromagnetic radiation EM constituting the transmission spectrum takes place. Said combination of electromagnetic radiation is in analogy to an additive color or additive mixing as it is known in the art, i.e. the overall color, here an overall electromagnetic radiation, corresponds to the sum of the component colors, here electromagnetic radiations. That is to say, an overall first reflection spectrum OR1 that is reflected from the data carrier 1 when the data carrier 1 is observed under the first viewing angle in reflection corresponds to a combination spectrum being constituted by a first background reflection spectrum BR1 that is reflected from the background layer 5a upon impingement of the electromagnetic radiation constituting the first transmission spectrum T1. Likewise, an overall second reflection spectrum OR2 that is reflected from the data carrier 1 when the data carrier 1 is observed under the second viewing angle in reflection corresponds to a second combination spectrum being constituted by the second transmission spectrum T2 and electromagnetic radiation constituting a second background reflection spectrum BR2 that is reflected from the background layer 5a upon impingement of the electromagnetic radiation constituting the second transmission spectrum T2.

In addition, it is possible on a single data carrier to have a combination of white background, black background and/or coloured background and/or to include a transparent window to that security elements shown in FIGS. 7a through 7c may be combined into a single data carrier.

For illustrative purposes only FIGS. 8a to 9b depict photographs of security elements 4 based on optically variable elements that are multi-layer optical films and that are viewed under different viewing angles. In fact, the optically variable element 2 in these figures corresponds to a commercially available thin colored mirror (TCM) Thales TCM 515 film. Said optically variable element 2 is configured to reflect electromagnetic radiation having a peak at 515 nanometers, i.e. green light, for light being incident on the film 2 at a normal angle, i.e. being viewed under the first viewing angle in reflection. When said film 2 is tilted to an off-angle, i.e. being viewed under the second viewing angle in reflection, the peak of the reflectance band shifts from a maximum of 515 nanometer, i.e. green, to a peak at approximately 450 nanometer, i.e. blue. In transmitted light, or when a transparent or a white background layer 5a is placed below the film 2 with respect to the extension direction E, then the film 2 will appear magenta in normal angle viewing and will switch to orange when tilted off-angle because these are the wavelengths that are transmitted through the film 2. However, if a black background layer 5a is arranged below the film 2 with respect to the extension direction E, then the film 2 will appear green at normal angle and switch to blue when tilted off-angle.

Figure 8A:
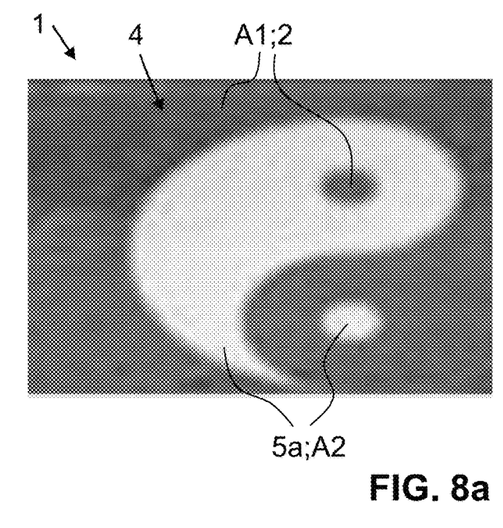
FIG. 8a shows a normal view on a data carrier comprising a security element of a first and a second appearance.
Figure 8B:
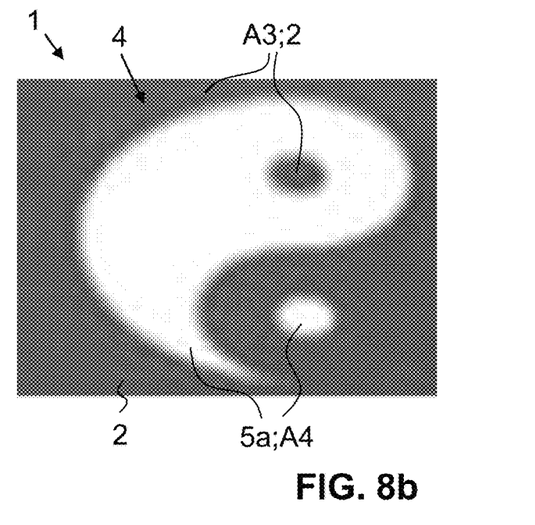
FIG. 8b shows an off-angle view on the data carrier according to FIG. 8a, wherein the security element is of a third and fourth appearance.
Figure 9A:
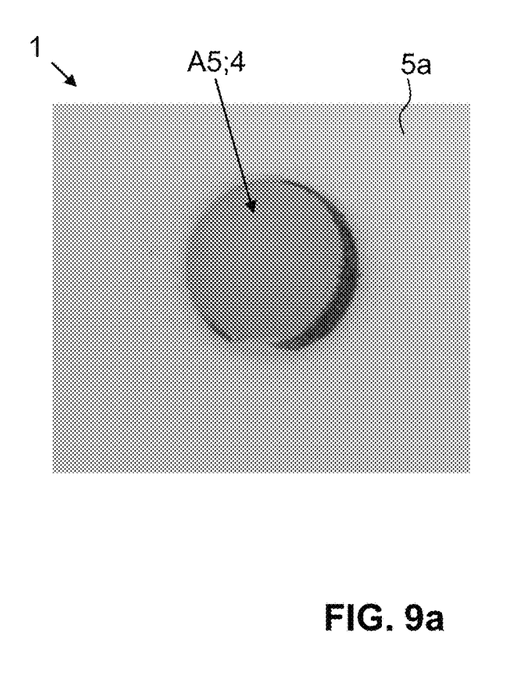
FIG. 9a shows a normal view on a data carrier comprising another security element of a fifth appearance.
Figure 9B:
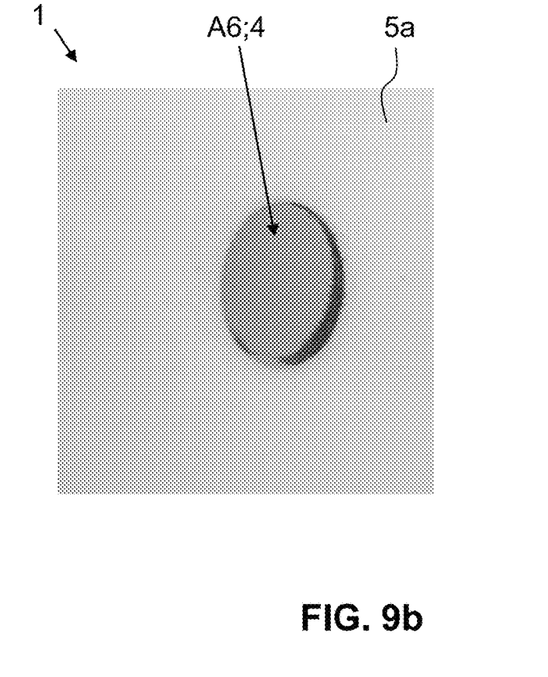
FIG. 9b shows an off-angle view on the data carrier according to FIG. 9a, wherein the security element is of a sixth appearance.

To this end FIGS. 8a and 8b depict a security element 4 that comprises the CM 515 film as optically variable element 2 and a background layer 5a being composed of white ink and black ink. Hence, the security element 4 with regions of black ink and white ink will appear green in the regions of black ink and magenta in regions of white ink when viewed at normal angle, i.e. under the first viewing angle in reflection. The green appearance and the magenta appearance are indicated in FIG. 8a as first appearance A1 and second appearance A2, respectively. However, when the security element 4 is viewed at an off-angle, i.e. under the second viewing angle in reflection, the appearances of these regions change into a blue appearance in the region of black ink and orange appearance in the regions of white ink. The blue appearance and the orange appearance are indicated in FIG. 8b as third appearance A3 and fourth appearance A4. FIGS. 9a and 9b depict a normal view and an off-angle view of a security element 4 comprising the TCM 515 film as optically variable element 2 and a transparent background layer 5a when seen in transmission. Hence, the security elements 4 depicted in FIG. 9a appears in magenta in normal view and in orange in off-angle view, which are indicated as fifth appearance A5 and sixth appearance A6 in FIGS. 9a and 9b, respectively.

Hence, if a tamper-indicating element 7 as described above is arranged between the optically variable element 2 and the background element 5a, then said color-shifting attributes of the security element 4 are removed upon a separation of the background layer 5a from the optically variable element 2.

An appearance of the optically variable element 2 can further be changed by the provision of an embossment 6 or a light-diffusing coating, for example.

Figure 10:
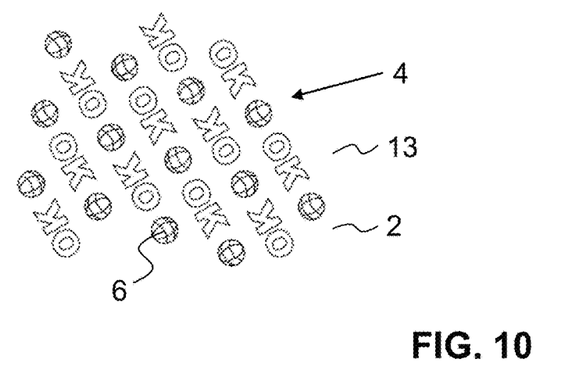
FIG. 10 shows a front view on an optically variable element comprising an embossment.
Figure 11A:
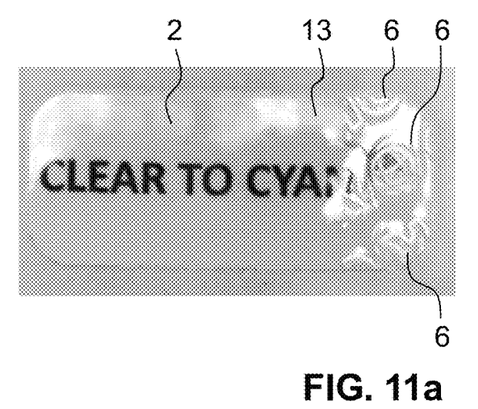
FIG. 11a shows a front view on an optically variable element comprising an embossment under a first viewing angle.
Figure 11B:
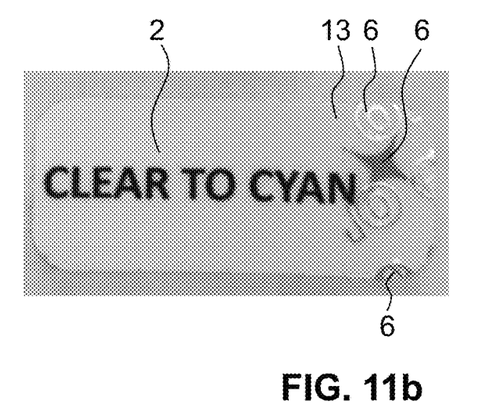
FIG. 11b shows a front view on the optically variable element according to FIG. 11a under another viewing angle.
Figure 11C:
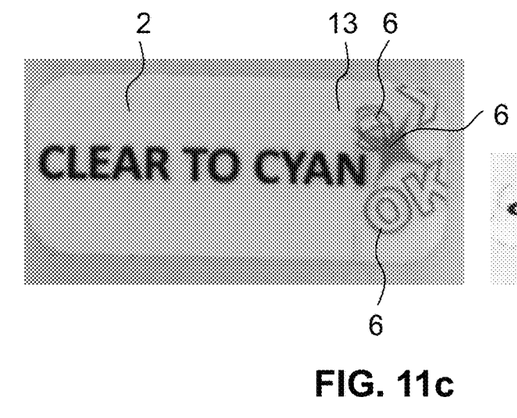
FIG. 11c shows a front view on an optically variable element according to FIG. 11a under another viewing angle.
Figure 11D:
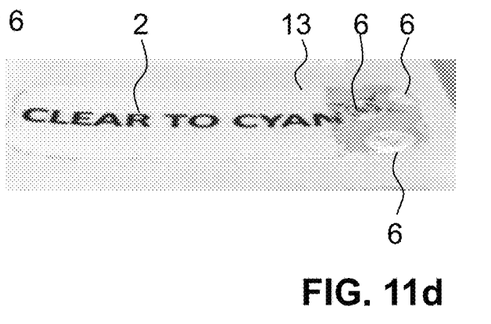
FIG. 11d shows a front view on an optically variable element according to FIG. 11a under another viewing angle.

For example, and as follows from FIG. 10, an embossment 6 can be compressed in the optically variable element 2. Said compression is formed in an upper surface 13 of the optically variable element 2 and is typically formed by embossing with a raised metal tool using elevated temperature and pressure. Because the embossment 6, i.e. the compression, may change a thickness of the optically variable element 2 with respect to the extension direction E, electromagnetic radiation of different wavelengths is reflected and transmitted from the optically variable element 2 in regions of the embossment 6 as compared to regions without an embossment 6. This different appearance shall be illustrated by means of the photographs depicted in FIGS. 11a to 11d. In fact, these figures depicts an embossment 6 in the form of images, i.e. a globe as well as in the form of an alphanumeric character, i.e. the expression "OK". The embossments 6 are generated in a so-called clear to cyan (C2C) colored mirror as optically variable element 2, which is again commercially available. The photographs depicted in FIGS. 11a to 11d are taken at different viewing angles. As is readily apparent from these figures, the appearance of the embossments 6 changes in dependency of the viewing angle. Since the embossments 6 can take the form of an alphanumeric character and/or image and since they are permanent features that cannot be removed from the optically variable element 2, they can constitute an additional security element of increased security.

Besides, it should be noted that the data carrier can include other security elements such as security slits, which are cuts in the optically variable element. It should be further noted that the data carrier according to the invention can comprise other layers and/or components between the different components that have been discussed above, wherein said other layers or components correspond to layers and components as they are well-known in the art.

| LIST OF REFERENCE SIGNS | | | |
|---|---|---|---|
| 1 | data carrier | 19 | bottom surface |
| 2 | optically variable element | 20 | security document |
| 3 | substrate | 21 | page |
| 4 | security element | 22 | front side |
| 4a, 4b | part of the security element | 23 | back side |
| 5a, 5b | background element | | |
| 5a1, 5a2 | background element portion | A1, A2, . . . | appearance |
| 6 | security element | E | extension direction |
| 7 | tamper-indicating element | P1 | first pulling direction |
| 7a, 7b | part of the tamper-indicating element | P2 | second pulling direction |
| | | EM | electromagnetic radiation |
| 8a | region of first cohesive strength | R1 | first reflection spectrum |
| | | R2 | second reflection spectrum |
| 8b | region of second cohesive strength | T1 | first transmission spectrum |
| | | T2 | second transmission spectrum |
| 9 | layer | | |
| 10 | upper surface | BR1 | first background reflection spectrum |
| 11 | lower surface | | |
| 12 | lower surface | BR2 | second background reflection spectrum |
| 13 | upper surface | | |
| 14 | upper surface | OR1 | overall first reflection spectrum |
| 15 | lower surface | | |
| 16 | intermediate layer | OR2 | overall second reflection spectrum |
| 17 | card body | | |
| 18 | top surface | | |

The invention claimed is:

1. A data carrier comprising:
at least one optically variable element configured such that
electromagnetic radiation constituting a first reflection spectrum is reflected from the at least one optically variable element when the data carrier is observed under a first viewing angle,
electromagnetic radiation constituting a second reflection spectrum being different from the first reflection spectrum is reflected from the at least one optically variable element when the data carrier is observed under a second viewing angle being different from the first viewing angle,
electromagnetic radiation constituting a first transmission spectrum is transmitted through the at least one optically variable element when the data carrier is observed under the first viewing angle, and
electromagnetic radiation constituting a second transmission spectrum is transmitted through the at least one optically variable element when the data carrier is observed under the second viewing angle,
at least one background element, which is arranged after the at least one optically variable element when seen along an extension direction and configured such that an overall first reflection spectrum that is reflected from the data carrier when the data carrier is observed under the first viewing angle essentially corresponds to:
i) the first reflection spectrum, or
ii) the first transmission spectrum, or
iii) a first combination spectrum being constituted by the first transmission spectrum and electromagnetic radiation constituting a first background reflection spectrum (BR1) that is reflected from the at least one background element upon impingement of the electromagnetic radiation constituting the first transmission spectrum, and/or
that an overall second reflection spectrum (OR2) that is reflected from the data carrier when the data carrier is observed under the second viewing angle essentially corresponds to:
i) the second reflection spectrum, or
ii) the second transmission spectrum, or
iii) a second combination spectrum being constituted by the second transmission spectrum and electromagnetic radiation constituting a second background reflection spectrum that is reflected from the at least one background element upon impingement of the electromagnetic radiation constituting the second transmission spectrum; and
at least one security element, which comprises at least a part of the at least one optically variable element and at least a part of the at least one background element,
at least one tamper-indicating element, which is arranged at least in a region between the at least one optically variable element and the at least one background element with respect to the extension direction, wherein the tamper-indicating element is configured such, that the at least one optically variable element and the at least one background element at least in a region of the at least one security element are at least partially separable from one another upon an application of force onto the at least one optically variable element along a first pulling direction running opposite to the extension direction and/or upon an application of force onto the at least one background element along a second pulling direction running along the extension direction, whereby the at least one security element is at least partially separated into two or more parts.

2. The data carrier according to claim 1, wherein the tamper-indicating element is configured such, that it is separable into two or more parts upon the application of force along the first pulling direction and/or along the second pulling direction.

3. The data carrier according to claim 1, wherein the tamper-indicating element is configured mechanically weak such that it is preferably entirely separable along a transverse direction running perpendicularly to the extension direction into an upper part and a lower part, and
wherein the upper part of the tamper-indicating element remains in connection with the optically variable element and the lower part of the tamper-indicating element remains in connection with the background element.

4. The data carrier according to claim 1, wherein the tamper-indicating element comprises one or more regions of a first cohesive strength and one or more regions of a second cohesive strength being lower than the first cohesive strength, and wherein the one or more regions of the first cohesive strength and the one or more regions of the second cohesive strength are provided with respect to a transverse direction running perpendicular to the extension direction preferably in an alternating manner.

5. The data carrier according to claim 1, wherein the background element is arranged on a lower surface of the tamper-indicating element, and/or further comprising at least one further background element that is arranged on an upper surface of the tamper-indicating element, the background element and/or the further background element preferably being a print particularly preferably in the form of an image and/or an alphanumeric character.

6. The data carrier according to claim 1, wherein the at least one optically variable element and the at least one background element are arranged essentially entirely congruent to one another when seen along the extension direction, or wherein the at least one optically variable element and the at least one background element are arranged partly congruent to one another when seen along the extension direction.

7. The data carrier according to claim 1, wherein the at least one background element is composed of one or more materials being configured to essentially completely absorb impinging electromagnetic radiation in the visible region of the electromagnetic spectrum or to essentially completely transmit impinging electromagnetic radiation in an ultraviolet region, a visible region and an infrared region of the electromagnetic spectrum, and wherein the at least one background element is preferably of a black colour or is transparent.

8. The data carrier according to claim 1, wherein the at least one background element is composed of one or more materials being configured to essentially entirely reflect impinging electromagnetic radiation in the visible region of the electromagnetic spectrum, and wherein the at least one background element is preferably of a white colour.

9. The data carrier according to claim 1, wherein the at least one background element is composed of one or more materials being configured to reflect electromagnetic radiation being composed of one or more wavelengths in the visible region of the electromagnetic spectrum upon impingement of electromagnetic radiation in the visible region of the electromagnetic spectrum, and wherein the at least one background element is preferably coloured.

10. The data carrier according to claim 1, further comprising at least one coating element that is arranged before the at least one optically variable element with respect to the extension direction, wherein the at least one coating element is configured to absorb electromagnetic radiation constituting the first reflection spectrum and/or the second reflection spectrum and/or the first transmission spectrum and/or the second transmission spectrum and/or the first combination spectrum and/or the second combination spectrum, and/or wherein the coating is configured to diffuse electromagnetic radiation constituting the first reflection spectrum and/or the second reflection spectrum and/or the first transmission spectrum and/or the second transmission spectrum and/or the first combination spectrum and/or the second combination spectrum.

11. The data carrier according to claim 1, wherein the at least one optically variable element comprises one or more embossments, and wherein electromagnetic radiation that is reflected from the optically variable element differs from electromagnetic radiation being reflected from the one or more embossments.

12. The data carrier according to claim 1, wherein at least one of:

i) the data carrier comprises at least one further optically variable element, wherein the at least one optically variable element and the at least one further optically variable element are arranged on a same height or on a different height when seen along the extension direction, and/or wherein the at least one optically variable element and the at least one further optically variable element are arranged immediately adjacent to one another or at a distance from one another with respect to a transverse direction running perpendicularly to the extension direction, and ii) the data carrier comprises at least one further background element, wherein the at least one background element and the at least one further background element are arranged on a same height or on a different height when seen along the extension direction, and/or wherein the at least one background element and the at least one further background element are arranged immediately adjacent to one another or at a distance from one another with respect to a transverse direction running perpendicularly to the extension direction.

13. A security document comprising:

a data carrier, having:

at least one optically variable element configured such that electromagnetic radiation constituting a first reflection spectrum is reflected from the at least one optically variable element when the data carrier is observed under a first viewing angle, electromagnetic radiation constituting a second reflection spectrum being different from the first reflection spectrum is reflected from the at least one optically variable element when the data carrier is observed under a second viewing angle being different from the first viewing angle, electromagnetic radiation constituting a first transmission spectrum is transmitted through the at least one optically variable element when the data carrier is observed under the first viewing angle, and electromagnetic radiation constituting a second transmission spectrum is transmitted through the at least one optically variable element when the data carrier is observed under the second viewing angle, at least one background element, which is arranged after the at least one optically variable element when seen along an extension direction and configured such that an overall first reflection spectrum that is reflected from the data carrier when the data carrier is observed under the first viewing angle essentially corresponds to:

i) the first reflection spectrum, or ii) the first transmission spectrum, or iii) a first combination spectrum being constituted by the first transmission spectrum and electromagnetic radiation constituting a first background reflection spectrum (BR1) that is reflected from the at least one background element upon impingement of the electromagnetic radiation constituting the first transmission spectrum, and/or that an overall second reflection spectrum (OR2) that is reflected from the data carrier when the data carrier is observed under the second viewing angle essentially corresponds to:
i) the second reflection spectrum, or
ii) the second transmission spectrum, or
iii) a second combination spectrum being constituted by the second transmission spectrum and electromagnetic radiation constituting a second background reflection spectrum that is reflected from the at least one background element upon impingement of the electromagnetic radiation constituting the second transmission spectrum; and at least one security element, which comprises at least a part of the at least one optically variable element and at least a part of the at least one background element, at least one tamper-indicating element, which is arranged at least in a region between the at least one optically variable element and the at least one background element with respect to the extension direction, wherein the tamper-indicating element is configured such, that the at least one optically variable element and the at least one background element at least in a region of the at least one security element are at least partially separable from one another upon an application of force onto the at least one optically variable element along a first pulling direction running opposite to the extension direction and/or upon an application of force onto the at least one background element along a second pulling direction running along the extension direction, whereby the at least one security element is at least partially separated into two or more parts.

14. The security document according to claim 13 wherein the security document is an identity card, a passport, a credit card, a bank note, a security label, or the like.

15. A method of producing a data carrier comprising the steps of:
providing at least one optically variable element configured such that
electromagnetic radiation constituting a first reflection spectrum is reflected from the at least one optically variable element when the data carrier is observed under a first viewing angle,
electromagnetic radiation constituting a second reflection spectrum being different from the first reflection spectrum is reflected from the at least one optically variable element when the data carrier is observed under a second viewing angle being different from the first viewing angle,
electromagnetic radiation constituting a first transmission spectrum is transmitted through the at least one optically variable element when the data carrier is observed under the first viewing angle, and
electromagnetic radiation constituting a second transmission spectrum is transmitted through the at least one optically variable element when the data carrier is observed under the second viewing angle, providing at least one background element, which is arranged after the at least one optically variable element when seen along an extension direction and configured such that an overall first reflection spectrum that is reflected from the data carrier when the data carrier is observed under the first viewing angle essentially corresponds to:
i) the first reflection spectrum, or
ii) the first transmission spectrum, or
iii) a first combination spectrum being constituted by the first transmission spectrum and electromagnetic radiation constituting a first background reflection spectrum (BR1) that is reflected from the at least one background element upon impingement of the electromagnetic radiation constituting the first transmission spectrum, and/or that an overall second reflection spectrum (OR2) that is reflected from the data carrier when the data carrier is observed under the second viewing angle essentially corresponds to:
i) the second reflection spectrum, or
ii) the second transmission spectrum, or
iii) a second combination spectrum being constituted by the second transmission spectrum and electromagnetic radiation constituting a second background reflection spectrum that is reflected from the at least one background element upon impingement of the electromagnetic radiation constituting the second transmission spectrum; and providing at least one security element, wherein the at least one security element comprises at least a part of the at least one optically variable element and at least a part of the at least one background element, providing at least one tamper-indicating element at least in a region between the at least one optically variable element and the at least one background element with respect to the extension direction,
wherein the tamper-indicating element is configured such, that the at least one optically variable element and the at least one background element at least in a region of the at least one security element are at least partially separable from one another upon an application of force onto the at least one optically variable element along a first pulling direction running opposite to the extension direction and/or upon an application of force onto the at least one background element along a second pulling direction running along the extension direction, whereby the at least one security element is at least partially separated into two or more parts.

* * * * *